Oct. 19, 1926.
A. H. GIBSON
1,604,033
CABLE CLAMP
Filed Nov. 28, 1925
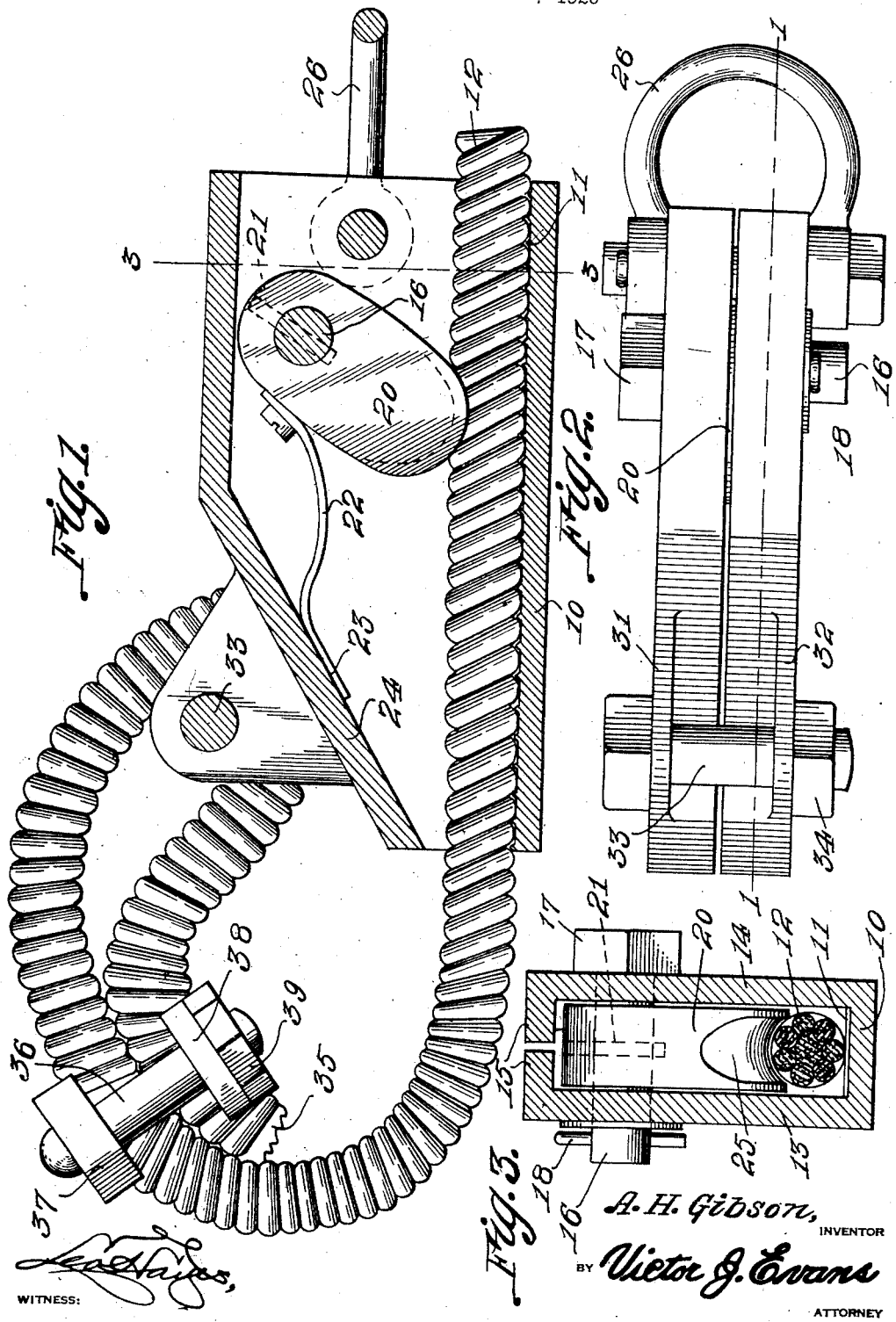
A. H. Gibson,
INVENTOR
BY Victor J. Evans
ATTORNEY
WITNESS:

Patented Oct. 19, 1926.

1,604,033

UNITED STATES PATENT OFFICE.

ATMER HENRY GIBSON, OF HUNTSVILLE, TEXAS.

CABLE CLAMP.

Application filed November 28, 1925. Serial No. 71,955.

The object of this invention is to provide a cable clamp of improved construction, and one adapted for use with cables or ropes of different sizes, for taking up slack therein without damage to the cable.

A further object is to provide, in a device of this character, a main portion, or box like element through which the cable passes, and between the side walls of which an eccentrically mounted device is adapted to be retained by resilient means, and to contact with a cable, when one side of the latter is in engagement with a corrugated or similarly formed surface on the inner side of the box member.

A further object is to provide a particular form of mounting for the eccentric member.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view of the device in longitudinal section, the operative elements being shown in elevation, and a portion of said elements in dotted line.

Figure 2 is a plan view.

Figure 3 is an end elevation.

A box member in which the operative elements are mounted includes a portion 10, which may be considered as the base or bottom and which has an upper surface provided with corrugations 11 for engaging the cable 12, when the latter passes through the box member.

The side portions 13 and 14 of the box structure have upper end portions inwardly deflected as indicated at 15, the edge portions at this point approaching each other, but being shown slightly apart in Figure 3. The side members 13 and 14 are apertured and a bolt 16 passes through the apertured portions and includes a head 17 contacting with one side wall of the box structure, a cotter pin 18 passing through the bolt on the opposite side of the box, and retaining the parts in an obvious manner.

An eccentric element 20 is provided with a bore extending transversely thereof, and the bolt 16 passes through the bore, a pin 21 entering the upper end of element 20 and passing into a transverse bore in the bolt.

The eccentric 20 acts under the influence of a flat spring 22 slidable at 23 on the portion 24 of the box structure, and the spring serves to hold element 20 in intimate contact with one side of the cable 12. The engaging portion of eccentric member 20 is grooved as shown at 25, and this portion directly engages the cable, while the opposite side of the cable is engaged by corrugations 11.

A clevis 26 is connected with the box structure by means of a bolt 27, and extending upwardly from the portion 24 are ears such as 31 and 32 between which the cable 12 passes, the latter being secured at this point by means of bolt 33 engaged by a nut 34.

The extreme end 35 of cable 12 is retained by bolt or U-bolt 36 passing through cable engaging devices 37 and 38 and retained by means of nuts such as 39.

The position of the eccentric 20 with reference to the mounting means therefor and with reference to the cable, is such that when tension is placed on the cable, the gripping action will be in proportion to the degree of tension exerted.

What is claimed is:

1. A device of the class described, comprising a cable receiving element including portions movable with reference to each other, an eccentrically mounted member therein and having a concave cable gripping portion adapted to engage the cable from one side thereof, the cable receiving device having a portion of its inner surface corrugated and adapted to engage the cable from a side opposite to that engaged by the eccentric member, the spring exerting pressure on the eccentric member, a clamping device for the end of the cable, and means cooperating with the clamping device and mounted on the cable receiving element, for providing a plurality of loops in the cable beyond the portion thereof engaged by the corrugations, and on the slack end of the cable.

2. A device of the class described, comprising a cable receiving element, an eccentrically mounted member therein and adapted to engage the cable from one side thereof, the cable receiving device having a portion of its inner surface corrugated and adapted to engage the cable from a side opposite to that engaged by the eccentric member, the spring exerting pressure on the eccentric member, and means for securing the end of a cable passing through said receiving device and retaining it in loop form, said means including ears extending from the cable receiving element, a transverse member connecting the ears and passing thru the loop, and a clamping element engaging the cable at points between the transverse member and the point of engagement by the corrugations.

In testimony whereof I affix my signature.

ATMER HENRY GIBSON.